United States Patent Office 2,933,125
Patented Apr. 19, 1960

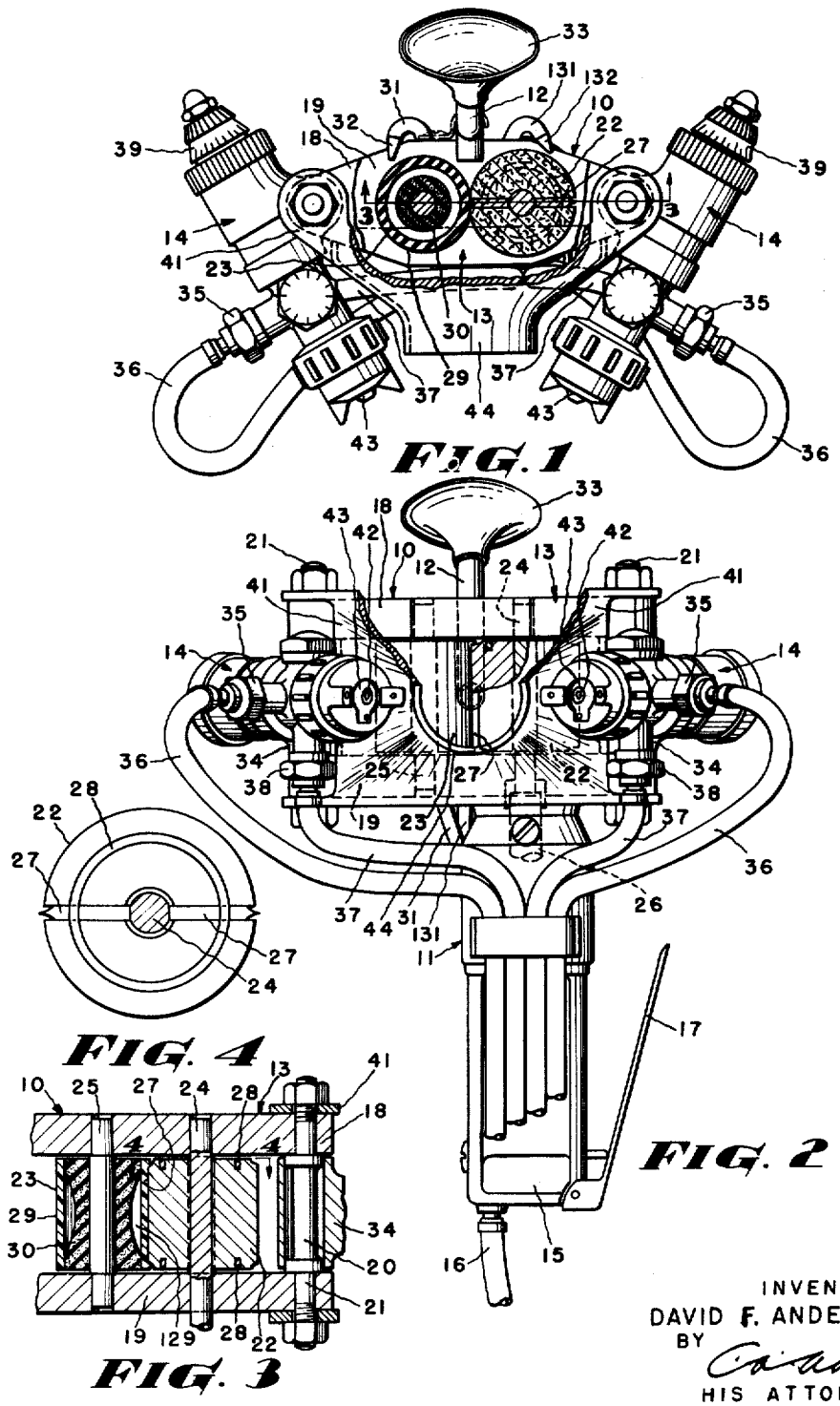

2,933,125

METHOD OF AND PORTABLE APPARATUS FOR DEPOSITING REINFORCED PLASTIC

David F. Anderson, Camden, Maine, assignor, by mesne assignments, to Canadian Ingersoll-Rand Co., Ltd., Montreal, Quebec, Canada, a corporation of Canada Application August 6, 1953, Serial No. 372,783

6 Claims. (Cl. 154—1)

This invention relates to the method of forming reinforced plastic articles by cutting fibers, spraying the cut fibers with an atomized plastic in a fluid state and depositing the fibers on a mold to form a fiber reinforced plastic article, and to a hand held machine for carrying out the method.

Fiber reinforced plastic articles are commonly made with fiber glass impregnated with a bonding plastic such as an alkyd polyester type of resin. Normally, the fiber glass is originally formed as roving, a rope-like material of about sixty strands, each strand being made up of two hundred or more continuous glass fibers. The form of the fiber when applied to the mold in making up reinforced plastic articles varies depending upon the method used in forming such article. For example in the "contact" and "low pressure" molding methods, frequently a specially prepared chopped strand mat is cut or tailored to fit a mold against which it is laid and thereafter sprayed or brushed with a bonding resin; or loose chopped fibers may be deposited on the form and subsequently impregnated with a bonding resin. In "compression molding" the glass fibers are pre-formed either by special equipment from loose fibers or by tailoring and fitting of pieces of chopped strand mat.

There are several distinct disadvantages associated with using either the chopped strand mat or the loose chopped fibers. For example where the chopped strand mat is used considerable labor is involved in tailoring and fitting the mat to the mold, especially where the form involves compound curvatures. Also it has been found to be extremely difficult to impregnate the mat with resin without entrapping unwanted air bubbles. Moreover, the chopped strand mat is considerably more expensive than roving. Where loose chopped fibers are used to reinforce the plastic article, it is found that it is difficult to meter out and deposit the fibers uniformly and in the desired quantities on the forms or molds. Also, loose chopped fibers are far more bulky, pound for pound, than is roving. This is a distinct disadvantage when it comes to transporting or storing the fiber.

The present invention includes the method of, and a hand-held device for cutting roving into desired lengths, ejecting the cut fiber into a spray of resin and then depositing the impregnated roving on a mold. By cutting the fiber, impregnating it and applying it all in one operation, the operator may readily deposit directly on to the mold only the appropriate quantities of fiber and activated resin thereby reducing to a minimum wastage of resin, fillers and pigment. Moreover, with this invention the resin and its setting components are mixed only at the point of actual use and hence only as needed. The advantage associated with this feature of the applicant's invention is that inasmuch as once the resin is activated or mixed with its setting component, it is necessary to use the resin within a relatively short time. Thus, the present invention eliminates the disadvantages associated with mixing a predetermined quantity of the resin and setting component to be used for a given job, a procedure which often leads to considerable wastage of resin.

It is to be noted that in the hand held tool, that the cutter may be used independently of the spray guns in instances where it is not desired to impregnate the roving with a resin as the roving is ejected from the cutter. For example, the cutter may be used to advantage to provide fibers to mix with resin to form a mixture of resin and fibers for use in "compression" molding. The cutter alone can also be used for cutting and depositing fibers to build up a mat of cut fibers for use, for example, between retaining sheets such as woven glass cloth or cheese cloth.

It is accordingly one object of this invention to provide a method of and portable fiber and plastic depositor for cutting fiber glass roving, impregnating the roving with a plastic bonding material and depositing the impregnated fiber glass on a form or mold in a single operation.

A second object is to provide such a depositor in which the cutter is adapted to cut roving of various thicknesses or twisted or tangled roving without interruption of operation or damage to the cutter.

Another object of this invention is to provide a fiber cutter capable of cutting fiber into predetermined lengths and depositing the cut fibers on a surface in any desired arrangement.

Further objects of this invention will become apparent from the following specification and drawings in which:

Figure 1 is a top view of a preferred form of the depositor.

Fig. 2 is a side elevation of the depositor,

Fig. 3 is a transverse view taken through Figure 1 along the line 3—3 looking in the direction of the arrows, and Fig. 4 is a transverse view taken through Fig. 3 along the line 4—4 looking in the direction of the arrows.

Referring to the drawings, and more particularly to Figure 1, a preferred form of the depositor is shown as comprising a self-feeding cutter 10 mounted on and driven by a motor 11. Fiber rope, or roving, is guided by a feed pipe 12 into one side of the cutter 10 wherein the roving is cut into the desired lengths and ejected from the opposite side of the cutter 10. Mounted on the opposite ends of the cutter frame 13 are spray guns 14 arranged to direct a spray of atomized plastic on the fiber cuttings ejected from the cutter 10. The sizes and weights of the cutter 10, motor 11 and spray guns 14 are such that the depositor may be hand-held and readily manipulated by the operator to direct a continuous stream of plastic impregnated fiber against a form or mold to build up a lamina of the reinforced plastic article being fabricated.

Referring in greater detail to the construction of the depositor, the motor 11 may be either an air-operated or a variable speed electric motor. For the purpose of illustration, the motor 11 shown is of the air-operated type having a casing 15 of relatively small diameter to provide a hand-grip for the depositor. Connected to the lower end of the casing 15 is the air intake line 16 and the motor speed control handle 17. Mounted on the opposite end of the motor 11 is the cutter frame 13 which comprises a pair of parallel plates 18 and 19, the plate 19 being mounted directly on the motor 11 and the plate 18 being held in spaced parallelism with the plate 19 by means of spacers 20 interposed between the ends of the plates and having stud ends 21 extending through and clamping the plates.

The cutting elements of the cutter 10 are in the form of a pair of cylindrical rollers 22 and 23 mounted between the plates 18 and 19 and having their respective shafts 24 and 25 journaled therein. The shaft 24 of the driving roller 22 is connected to and driven by the drive shaft 26 of the motor 11, the driven roller 23 is driven by frictional contact with the driving roller 22.

In the form of the invention illustrated, the driving roller 22 serves as the cutting cylinder and is accordingly provided with cutting members or blades 27 arranged to contact the driven roller for cutting the roving into relatively short sections. The blades 27 are mounted between the halves of the roller 22 and secured therein by rings 28 embedded in the opposite ends of the roller 22. For the purpose of illustration only two blades are shown and the roller 22 is formed of wood, but it is to be understood that the roller may be made of any suitable material and that the number of blades used is determined by the size of the roller 22 and the desired length into which the roving is to be cut. That is, the length of the sections of roving cut is determined by the distance between succeeding blades. This length may be varied either by varying the diameter of the roller 22 or by varying the number of cutters in the roller.

The driven roller 23 must present a surface hard enough to enable the cutting blades 27 to effectively cut the roving and yet the roller as a unit must be sufficiently elastic, or resilient, to prevent excessive cutting of the roller itself. For example, if the cutter blades extend twenty thousandths of an inch from the surface of the driving roller 22, then the driven roller must be capable of deflecting substantially the same distance away from the driving roller to avoid cutting of the roller 23.

In furtherance to this end the driven roller 23 comprises an outer sleeve 29 of, for example, thin metal or hard rubber based plastic, as shown, mounted on a relatively flexible inner core, or bobbin 30. The core 30 is sufficiently flexible to permit the outer sleeve 29 to deflect—i.e., the sleeve axis moves out of coincidence with the core axis, to prevent damage to the sleeve 29, but presents sufficient resistance to such deflection to enable the cutting blades to sever the roving.

Consistent with these requirements the core 30 is formed of a relatively soft and resilient material; a compressible rubber such as a sponge rubber can be used or a relatively incompressible rubber can be used in which case the core is formed such that space is available into which the material of the core may be displaced by movement of the sleeve 29. For example, the core 30 disclosed supports the sleeve 29 at its end marginal portions only and is tapered inwardly from both ends to provide a space 129 between the core and sleeve. Thus when the sleeve 29 is deflected by the forces applied during normal cutting operations or when tangled roving enters the cutter, the end portions of the core 30 are squeezed or forced into the clearance space 129 thereby permitting sufficient deflection of the sleeve 29 to preclude damaging of the sleeve 29 or interruption of operation of the cutter.

The core 30 is secured to the shaft 25 and the sleeve 29 is secured to the core 30 by means of an adhesive or in any other suitable manner.

In order to prevent the possibility of accumulations of particles of fiber glass on the rollers 22 and 23, a condition which may arise due to a static electricity effect, air is conducted from a source (not shown), or the exhaust from the motor 11, through conduits 31 and 131 and directed by nozzles 32 and 132 against the rollers 22 and 23, respectively, to remove any such fiber.

The fiber roving is directed into the cutter 10 through the feed pipe 12 and in order to permit relatively free movement of the depositor without danger of binding of the roving in the feed pipe, a funnel-shaped mouth 33 is provided at the inlet end of the feed pipe 12. The outlet end of the feed pipe is arranged adjacent to and in perpendicular relation to the line of contact between the rollers 22 and 23. Inasmuch as there is a friction drive between the two rollers, the roving once started into the cutter 10 is continuously drawn into the cutter by the rollers at a rate determined by the speed of rotation of the driving roller 22. The cut sections of the roving are ejected from the opposite side of the cutter 10 where they are picked up and impregnated by a spray of plastic emanating from the spray guns 14 secured to mounting brackets 34 pivotally encircling the spacers 20 of the cutter frame.

The guns 14 are mounted at longitudinally displaced points on the frame and are arranged to direct converging sprays intersecting a short distance from and directly in front of the cutter 10. The spray guns 14 may be of any type adapted to receive liquid plastic and air and emit an atomized spray of liquid plastic, such as the gun disclosed in United States Patent No. 2,059,706. The guns 14 shown by way of illustration are provided with an air connection 35 for connection with an air line 36 leading to a source of compressed air (not shown). Liquid plastic is supplied to the guns 14 from the source (not shown) through the line 37 connected to the gun 14 at 38. Preferably one of the guns 14 is supplied, through line 37, with a mixture of a resin and a catalyst and the other gun is supplied with a mixture of a resin and an accelerator. These two mixtures resist setting and remain useable for several days, however when the two mixtures are sprayed together on the roving, the resulting mixture of resin with the setting components of catalyst and accelerator will set in a matter of minutes.

The rate of discharge of plastic from the guns may be controlled by rotation of the control handle 39 on the rear end of the gun 14, or by changing the pressure on the resin supplied to the guns or by changing the size of an orifice 42 in the nozzle 43 of the spray gun. Mounted on the studs 21 on the outlet side of the cutter is a hood 41 having a tubular extension 44 located between the guns 14 for the passage of cut roving ejected from the cutter. The hood 41 serves to prevent resin spray from coming into contact with and adhering to the rollers 22 and 23.

I claim:

1. A portable reinforced plastic depositor comprising, a motor, a frame mounted on the motor, a cutter mounted on said frame connected to be driven by the motor and adapted to cut fiber rope into relatively short sections and eject the short sections into the air, spray guns mounted at longitudinally displaced points on the frame and arranged to direct converging sprays of liquid plastic away from the cutter and onto such air borne fiber sections on being ejected from the cutter, and means for supplying liquid plastic to said guns.

2. A portable reinforced plastic depositor comprising, a motor, a frame mounted on the motor, a cutter mounted on said frame and connected to be driven by the motor, said cutter including a pair of rollers, a cutting member carried by one of the rollers and arranged to contact the other of said rollers to cut fiber rope into relatively short sections, spray guns mounted on the frame and arranged to direct converging sprays of liquid plastic away from said cutter and onto such fiber sections adjacent to and on being ejected from the cutter to carry the impregnated fibers to the desired area of deposit, and means for supplying liquid plastic to said guns.

3. The method of forming a reinforced plastic article, comprising the steps of simultaneously cutting fiber roving into relatively short lengths and forming converging sprays of fluid plastic of resin and setting components, then moving the cut fibers directly into the spray, and projecting the sprayed fibers in an organized directable stream.

4. The method of forming a reinforced plastic article, comprising the steps of simultaneously cutting and ejecting fiber roving into relatively short lengths and forming converging sprays of a mixture of resin and catalyst and a mixture of resin and accelerator, then causing the cut fibers to move into the converging sprays, and carrying the fibers on the spray onto a form to build a lamina of the article.

5. A hand-held reinforced plastic depositor comprising a motor, a cutter connected to be driven by the motor and adapted to cut and eject fiber roving into relatively short sections, means mounted to direct commingled sprays of liquid plastic away from the cutter and onto such fiber sections on being ejected from the cutter, and means for supplying such plastic to said means including means for supplying accelerator and catalyst components of such plastic separately and simultaneously to said spray means to be mixed by such commingling.

6. In the method of fabricating reinforced plastic articles, the steps of simultaneously cutting fiber roving into relatively short lengths and ejecting the same in a stream through the air to the area of deposit, forming separate sprays of fluid plastic components, directing said sprays to meet and mix, said plastic components comprising accelerator and catalyst which are present only in separate sprays and mix in meeting, said sprays being directed to meet and mix in said stream of short fiber lengths whereby the short fiber lengths are coated by the plastic components while still in said stream and are projected with excess plastic components in an organized stream.

References Cited in the file of this patent

UNITED STATES PATENTS

| | | |
|---|---|---|
| 1,367,050 | Jagenburg | Feb. 1, 1921 |
| 1,796,821 | Aldrich | Mar. 17, 1931 |
| 1,856,085 | Walters | May 3, 1932 |
| 2,152,901 | Manning | Apr. 4, 1939 |
| 2,331,230 | Rippl | Oct. 5, 1943 |
| 2,528,168 | Paulsen | Oct. 31, 1950 |
| 2,571,334 | Browne | Oct. 16, 1951 |
| 2,601,048 | Monger | June 17, 1952 |
| 2,609,320 | Modigliana | Sept. 2, 1952 |
| 2,653,355 | Essman | Sept. 29, 1953 |
| 2,702,261 | Bacon et al. | Feb. 15, 1955 |
| 2,787,314 | Anderson | Apr. 4, 1957 |